(No Model.)
G. H. ZEAL.
THERMOMETRIC ELECTRICAL CIRCUIT CLOSER.
No. 592,600. Patented Oct. 26, 1897.
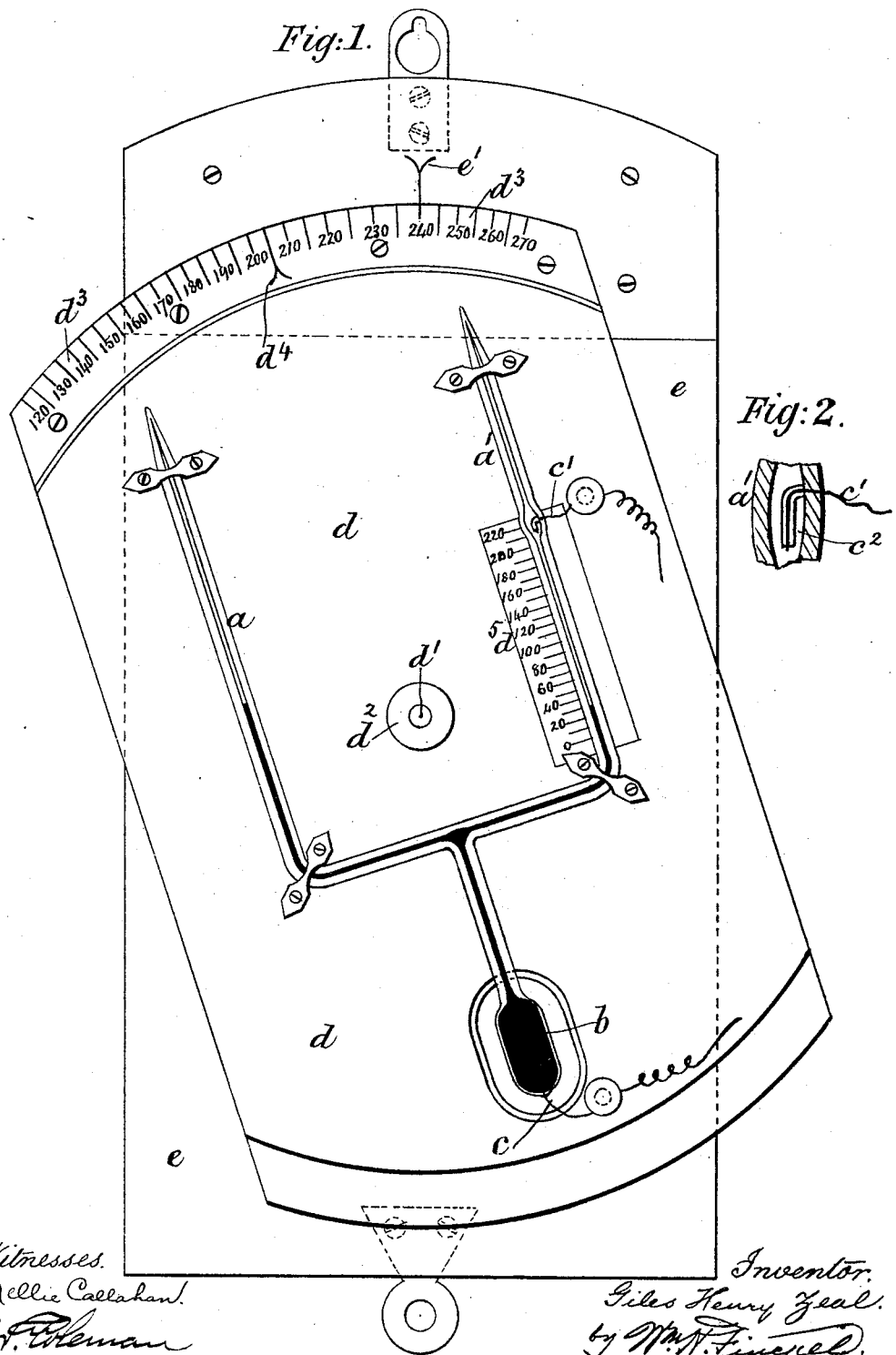

UNITED STATES PATENT OFFICE.

GILES H. ZEAL, OF LONDON, ENGLAND, ASSIGNOR TO JAMES JOSEPH HICKS, OF SAME PLACE.

THERMOMETRIC ELECTRICAL CIRCUIT-CLOSER.

SPECIFICATION forming part of Letters Patent No. 592,600, dated October 26, 1897.

Application filed May 10, 1897. Serial No. 635,877. (No model.)

*To all whom it may concern:*

Be it known that I, GILES HENRY ZEAL, a subject of the Queen of Great Britain, residing at London, England, have invented an Improved Thermometric Electrical Circuit-Closer, of which the following is a full, clear, and exact description.

My invention relates to an improved thermometric electrical circuit-closer for causing an alarm to be sounded or a thermostatic regulator to be operated on the attainment of a predetermined temperature or for other uses; and the invention has for its object to enable the circuit-closer to be set for action at any temperature within its range without the employment of movable terminals such as have heretofore been used for the purpose.

My invention is illustrated in the accompanying drawings, in which—

Figure 1 is a face view of the improved thermometric electrical circuit-closer, and Fig. 2 is a detail view of part thereof.

The invention consists of a mercurial thermometer of U or other shape having two tubes $a$ $a'$ somewhat wide apart connected with a single bulb $b$, the one terminal, $c$, of the electric circuit being usually in permanent electrical connection with the mercury, as shown, and the other, $c'$, entering the bore of one of the tubes (the tube $a'$) at a point above the normal height of the mercurial column.

The thermometer-mount $d$ is pivoted at $d'$ to a suitable fixed support or backboard $e$, in order that by inclining the thermometer in a plane parallel with the plane of the tubes one tube $a$ or $a'$ may be raised and the other lowered, so as to cause the relative lengths of the mercurial column therein contained to be varied, (by reason of the fact that the mercury always has common absolute level in both,) thus varying more or less the distance separating the one column (the column $a'$) from the terminal $c'$ in its bore, and consequently varying more or less the height through which the mercury must rise and the increase of temperature which must occur before the circuit is closed. The pivot $d'$ is screw-threaded and is fixed in the mount or backboard $e$, while a milled-headed nut $d^2$ acts in connection with such screw-threaded pivot $d'$ to clamp the thermometer-mount $d$ to the fixed support or backboard $e$ in any desired position.

In adjusting the instrument the degree of inclination to be given in order that the alarm shall be sounded or the thermostatic regulator be operated on the attainment of a given temperature is ascertained by setting it with reference to an index and scale of temperatures corresponding to different inclinations and marked upon the fixed and movable parts of the instrument.

In the instrument represented in the drawings the thermometer-mount $d$ is provided with a scale $d^3$ and a central index $d^4$, and the fixed support or backboard $e$ has an index $e'$ thereon. The mount $d$ has also a scale $d^5$ thereon. Thus when the central index $d^4$ of the mount $d$ is in line with the index $e'$ of the mount $e$ the thermometer is in its normal position, and the approximate temperature can be ascertained by reference to the position of the mercurial column in relation to the scale $d^5$; but by inclining the thermometer-mount $d$ in either direction from such position the instrument can be set to close the electric circuit at any temperature within the range of the scale $d^3$.

In order to prevent, as far as possible, the terminal $c'$ from retaining a globule of mercury around it, I incase such terminal $c'$, as shown at Fig. 2, with a thin coating $c^2$, of glass, leaving only a very small portion of the terminal $c'$ extending beyond the glass coating.

It will be evident that the scale $d^3$ might be applied to the mount or backboard $e$ instead of to the thermometric mount $d$.

Having fully described my invention, what I claim, and desire to secure by Letters Patent, is—

1. A thermometric electrical circuit-closer, comprising a two-tube thermometer and circuit-terminals applied thereto, a mount carrying said thermometer, a fixed support or backboard to which the mount is pivoted and upon which it is adapted to be turned on its pivot, in a plane parallel with the plane of the tubes, to vary the heights of the mercury in the tubes, and thereby vary the distance between the mercurial column and one of the circuit-terminals, whereby the circuit may be closed at varying temperatures, substantially as described.

2. In a thermometric electrical circuit-closer, the combination of a two-tubed thermometer provided with electrical contacts, a mount carrying such thermometer and pivoted to a fixed support or backboard, a scale on one of such parts, an index on the other part, and means for clamping the thermometer-mount to the fixed support or backboard in the required position to close the electric circuit on any given temperature being attained, substantially as herein set forth.

3. In a thermometric electrical circuit-closer, the combination therewith of an electrical contact permanently in contact with the mercury, and a terminal extending in the bore of the tube of the thermometer, and provided therein with a glass coating surrounding said terminal to within a short distance of its end, substantially as and for the purpose described.

In testimony whereof I affix my signature in presence of two witnesses.

G. H. ZEAL.

Witnesses:
CLAUDE K. MILLS,
H. SEYMOUR MILLS.